(No Model.) 2 Sheets—Sheet 1.

W. O. BAILEY.
MITER CUTTING AND SHOOTING BLOCK.

No. 604,290. Patented May 17, 1898.

Witnesses
Inventor
William O. Bailey
By James L. Norris
Atty.

THE NORRIS PETERS CO., PHOTO-LITHO., WASHINGTON, D. C.

(No Model.) 2 Sheets—Sheet 2.

W. O. BAILEY.
MITER CUTTING AND SHOOTING BLOCK.

No. 604,290. Patented May 17, 1898.

UNITED STATES PATENT OFFICE.

WILLIAM OLIVER BAILEY, OF LONDON, ENGLAND.

MITER CUTTING AND SHOOTING BLOCK.

SPECIFICATION forming part of Letters Patent No. 604,290, dated May 17, 1898.

Application filed December 24, 1897. Serial No. 663,324. (No model.) Patented in England July 9, 1895, No. 13,258.

*To all whom it may concern:*

Be it known that I, WILLIAM OLIVER BAILEY, glass merchant, silverer, and beveler, a subject of the Queen of Great Britain, residing at the Excelsior Works, Wenlock road, in the city of London, England, have invented a new and useful Improved Miter Cutting and Shooting Block, (for which I have obtained a patent in Great Britain, No. 13,258, bearing date July 9, 1895,) of which the following is a specification.

This invention relates to an improved miter cutting and shooting block; and its object is to obtain a block which shall be suitable for cutting moldings or the like with or without the use of a circular saw in such a manner as to produce any miter angle or bevel likely to be required and also for shooting the same, and which shall be provided with suitable means for securing the molding in its place during the cutting or shooting, so as to dispense with any necessity for holding it by the hand, and which shall have its wearable parts made easily and cheaply renewable.

In order that my said invention may be more fully understood, there are annexed hereto two sheets of drawings, illustrating the same, of which the first sheet illustrates my said invention and the second illustrates the same when a circular saw is used.

The same letters of reference are used throughout all the figures to indicate the same or corresponding parts of the blocks; but only the parts of one side of the block are lettered, inasmuch as the parts on both sides of the block exactly correspond.

Figure 1:
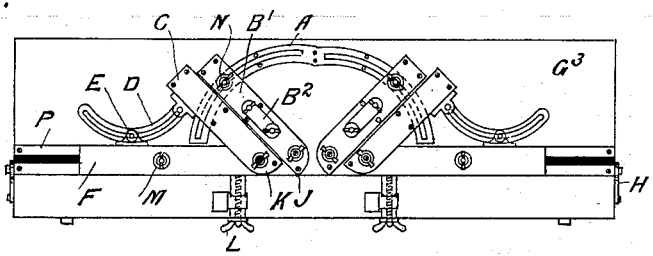
Figure 2:
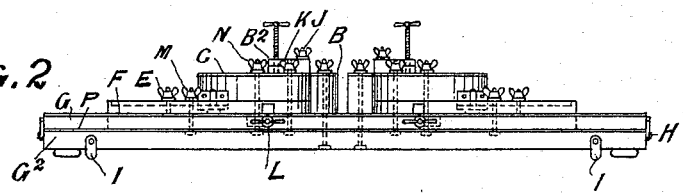
Figure 3:
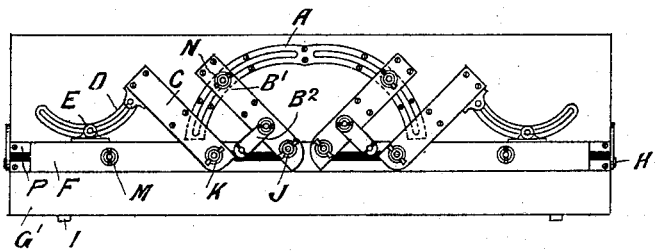
Figure 4:
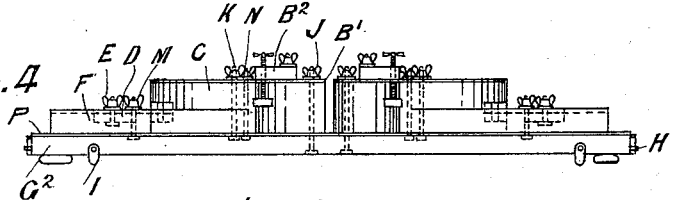
Figure 5:
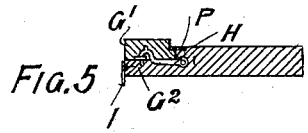
Figure 7:
Figure 6:
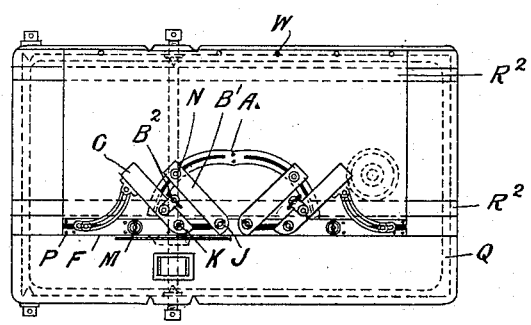
Figure 8:
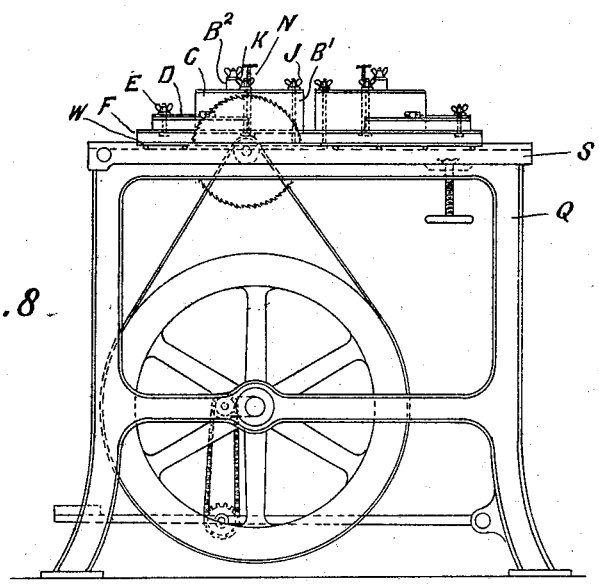

Figure 1 is a plan view of the improved miter cutting and shooting block. Fig. 2 is an elevation of Fig. 1. Fig. 3 is a plan view of the block adapted for shooting. Fig. 4 is an elevation of Fig. 3. Fig. 5 is a section of the bed-plate with removable platform attached thereto. Fig. 6 is a plan view of the block adapted to a circular saw and bench. Fig. 7 is a section of the bench and bed-plate. Fig. 8 is an elevation of Fig. 6.

$G^2$ is the bed-plate.

$G'$ is the removable platform.

$B'$ is the guide-block.

J is the fly-nut to the bolt on which the guide-block $B'$ is pivoted to the raised platform $G^3$.

N is the fly-nut to the bolt which passes through the outer end of the guide-block $B'$ into the slotted quadrant-plate A.

F is the sliding block.

E is the thumb-screw, which passes through the bracket which is attached to the sliding block F and on which the quadrant-iron works.

M is the fly-nut to the bolt which passes through the sliding block F into the raised platform $G^3$.

P is the slotted plate let into the edge of the raised platform.

C is the auxiliary guide-block.

K is the fly-nut to the bolt on which the auxiliary guide-block C is pivoted to the sliding block F.

D is the quadrant-iron, which is attached to the auxiliary guide-block C by a bracket and screw.

$G'$ is the removable platform.

H is a hook to fasten the removable platform to the raised platform.

I is a clip on the front side of the bed-plate.

L is a horizontal clamp let into the removable platform and worked with a thumb-screw.

$B^2$ is the vertical clamp with metal block, through which passes the thumb-screw which works the vertical clamp.

S is the bed-plate of the saw-bench.

$R^2$ are the runners.

W are the rollers.

In carrying my invention into effect I construct the block as follows, and first I proceed to describe it as constructed when it is not intended to use a circular saw:

I take a bed-plate $G^2$, which is preferably of wood, but may be of any other suitable material, and which is preferably about three feet by one foot in dimensions, but which may be of any required dimensions, and which is provided with a raised platform $G^3$, extending throughout its length. If the raised platform is of wood or other soft material, I let into it a slotted metal plate P, extending throughout its length along its inner edge. Upon and close to the inner edge of this raised platform I mount two movable blocks $B'$, of wood or other suitable material, one immediately to the right and the other immediately to the left of a line drawn transversely across the center of the bed-plate, so as to form right and left side guide-blocks for cutting and shooting miters and bevels. Each of these blocks B' is mounted by a bolt and fly-nut J at the end nearest to the inner edge of the raised platform and is left free at the outer end, so as to swing on the bolt and be adjustable to any angle likely to be required. When so adjusted, the block is secured in position by means of a bolt which passes through a hole pierced in the outer end of the block and works in and under a slotted metal quadrant-plate A, which is let into the raised platform and may be marked with a scale to denote the angle. The bolt is held in position by a fly-nut N at the top. Also upon and close to the inner edge of the raised platform I mount two other movable blocks F, of wood or other suitable material, one to the right of the right-side guide-block and the other to the left of the left-side guide-block B'. Each of these blocks is permitted to slide in a direction parallel to the edge of the raised platform and in a line therewith by means of a bolt which passes through a hole pierced in the outer end of the block and works in and under the slot in the metal plate P, let into the inner edge of the raised platform. The bolt is held in position by a fly-nut M at the top.

To each of the two sliding blocks is attached by means of a bolt and fly-nut K (which bolt also works in and under the slot in the metal plate let in the inner edge of the raised platform) at the end thereof nearest to the center of the bed-plate an auxiliary guide-block C, which swings on the bolt and is adjustable, so as to lie parallel with the right or left side guide-block B', as the case may be, and to form with such guide-block a guide for the saw when cutting or for the molding when shooting. When so adjusted, the auxiliary guide-block is secured in position by means of a quadrant-iron D, fastened at one end by means of a bracket and bolt or rivet to the outer side of the auxiliary guide-block and working on a thumb-screw E, which passes into a bracket attached to the corresponding side of the sliding block.

In order to enable the block, constructed as aforesaid, to be used for cutting as well as for shooting the joint or bevel, I provide a removable platform G', which corresponds in length and width with the part of the bed-plate not covered by the raised platform G³, and which when in position fits thereon and, being slightly greater in depth than the raised platform, raises the surface of the portion of the bed-plate on which it is fitted to a slightly-higher level than that of the raised platform. The removable platform G' extends higher than the raised platform G³, in order to prevent the saw from damaging the raised platform if the latter is made of wood and the raised platform from damaging the saw if said raised platform is of metal. The removable platform is more readily renewed than the raised platform, and hence its increased height. The removable platform is made detachable from the bed-plate; but it is easily attached thereto by means of a tongue running along the front side of the removable platform and made to fit under a rabbet in the raised platform. When in position, it is secured there by hooks H, pivoted to the ends of the bed-plate and engaging eyes on the ends of the removable platform. I do not, however, wish to be understood as confining myself to the use of the hooks and eyes for holding the removable platform in position.

When the block is intended to be used for shooting the joint or bevel, the removable platform is taken off the bed-plate and removed and the molding is placed between the guide-block and auxiliary guide-block on the right or left side, as required.

For the purpose of holding the molding firmly against the guide-blocks and auxiliary guide-blocks during the cutting process I provide a pair of horizontal clamps L, let into the removable platform and worked with thumb-screws.

For the purpose of holding the molding firmly down on the raised platform during the shooting process I provide a pair of vertical clamps B², each of which is worked by a thumb-screw and is attached to one or other of the guide-blocks or auxiliary guide-blocks by means of a block of metal, through one end of which passes the thumb-screw which works the clamp, and the other end of which is pivoted to the guide-block or auxiliary guide-block by a bolt and fly-nut, as shown.

I now proceed to describe the construction of the block when it is intended for use in connection with a circular saw and saw-bench. When the block is intended for use in this way, no removable platform is provided and the block is made without the part of the bed-plate on which the removable platform would rest, so that it, in fact, simply consists of the part which has previously been described as the raised platform, together with the guide-blocks, auxiliary guide-blocks, and sliding blocks thereon, and the other appurtenances of the same, as hereinbefore described.

The block is intended to be mounted on and used with any ordinary circular-saw bench Q, and in order to enable it to travel along the bench I mount it by means of dovetailed runners R² on a bed-plate S, attached to the bench, so that the bed-plate remains still while the block moves, and I further assist the movement of the block by the use of rollers W, which run on the bed-plate. I also place rollers W along the back edge of the block for the purpose of preventing friction. I find it convenient to widen the block when used with a circular saw, but this is not essential. I prefer to use a hollow-ground circular saw for ordinary cutting and a special saw for very fine joints. The saw can be worked either by the foot or by steam. It is obvious that when the block is used in conjunction with a circular saw it is equally well suited to square cutting as it is to angle cutting.

I claim—

1. The combination in miter cutting and shooting blocks, of a bed-plate formed with a raised platform, a pair of guide-blocks pivoted to the raised platform, a pair of quadrantal slotted plates in which the bolts attached to the guide-blocks work for adjusting the said guide-blocks, a pair of auxiliary guide-blocks mounted on a pair of sliding blocks, and a pair of quadrantal slotted plates for adjusting said auxiliary guide-blocks substantially as described.

2. The combination in miter cutting and shooting blocks, of a bed-plate formed with a raised platform, a pair of guide-blocks pivoted to the raised platform, a pair of quadrantal slotted plates in which the bolts attached to the guide-blocks work for adjusting the said guide-blocks, a pair of auxiliary guide-blocks mounted on a pair of sliding blocks, a pair of quadrantal slotted plates for adjusting said auxiliary guide-blocks, and a pair of horizontal clamps mounted in or upon the base-plate substantially as specified.

3. The combination, in miter cutting and shooting blocks, of a bed-plate formed with a raised platform, a pair of guide-blocks pivoted to the raised platform, a pair of quadrantal slotted plates in which the bolts attached to the guide-blocks work for adjusting the said guide-blocks, a pair of auxiliary guide-blocks mounted on a pair of sliding blocks, a pair of quadrantal slotted plates for adjusting said auxiliary guide-blocks, a pair of horizontal clamps, mounted in or upon the base-plate, and a pair of coöperating vertical clamps, substantially as specified.

4. The combination, in miter cutting and shooting blocks, of a bed-plate, carrying the guide-blocks, auxiliary guide-blocks and quadrantal slotted plates as described, a circular-saw bench, grooves and runners, and rollers, adapted and arranged substantially as described.

Dated this 14th day of December, 1897.

WILLIAM OLIVER BAILEY.

Witnesses:
GEORGE C. DOWNING;
FRED C. HARRIS.